United States Patent
Nilsson et al.

(10) Patent No.: US 11,848,694 B2
(45) Date of Patent: Dec. 19, 2023

(54) INTERFERENCE AWARE PACKET TRANSMISSION

(71) Applicant: Telefonaktiebolaget LM Ericsson (publ), Stockholm (SE)

(72) Inventors: Thomas Nilsson, Malmö (SE); Dzevdan Kapetanovic, Lund (SE)

(73) Assignee: TELEFONAKTIEBOLAGET LM ERICSSON, (PUBL), Stockholm (SE)

( * ) Notice: Subject to any disclaimer, the term of this patent is extended or adjusted under 35 U.S.C. 154(b) by 0 days.

(21) Appl. No.: 16/645,526

(22) PCT Filed: Dec. 18, 2017

(86) PCT No.: PCT/EP2017/083332
§ 371 (c)(1),
(2) Date: Mar. 9, 2020

(87) PCT Pub. No.: WO2019/072405
PCT Pub. Date: Apr. 18, 2019

(65) Prior Publication Data
US 2020/0267737 A1    Aug. 20, 2020

(30) Foreign Application Priority Data

Oct. 9, 2017   (WO) .............. PCT/EP2017/075590

(51) Int. Cl.
*H04W 16/28* (2009.01)
*H04B 1/04* (2006.01)
(Continued)

(52) U.S. Cl.
CPC ......... *H04B 1/0475* (2013.01); *H04B 7/0617* (2013.01); *H04L 5/0023* (2013.01);
(Continued)

(58) Field of Classification Search
CPC ........... H04W 72/042; H04W 72/0446; H04W 76/27; H04L 5/0053; H04L 1/1812
(Continued)

(56) References Cited

U.S. PATENT DOCUMENTS 6,970,476 B1 * 11/2005 Jonsson .................. H04L 65/80
370/465
7,436,757 B1 * 10/2008 Wilson .................. H04L 5/0058
370/203

(Continued)

FOREIGN PATENT DOCUMENTS

| JP | 2008148105 A | * | 6/2008 |
| JP | 2008148105 A | | 6/2008 |
| JP | 2013509795 A | | 3/2013 |

OTHER PUBLICATIONS

Perahia, E. et al., "Next Generation Wireless LANs: 802.11n and 802.11ac", Ed. 2nd, Jan. 1, 2013, pp. 416-419, Cambridge University Press.

(Continued)

*Primary Examiner* — Syed Haider
(74) *Attorney, Agent, or Firm* — COATS & BENNETT, PLLC

(57) ABSTRACT

There is provided mechanisms for interference aware packet transmission. A method is performed by a radio transceiver device. The method comprises obtaining an estimate of interference in a surrounding of the radio transceiver device. The method comprises determining how many symbols for channel estimation to include in a packet to be transmitted based on amount of estimated interference. The method comprises transmitting the packet towards another radio transceiver device, where the packet comprises the determined amount of symbols for channel estimation.

14 Claims, 6 Drawing Sheets

(51) Int. Cl.
   *H04B 7/06* (2006.01)
   *H04W 52/24* (2009.01)
   *H04L 5/00* (2006.01)
   *H04L 25/02* (2006.01)
   *H04W 72/541* (2023.01)

(52) U.S. Cl.
   CPC ......... *H04L 25/0204* (2013.01); *H04W 16/28* (2013.01); *H04W 52/243* (2013.01); *H04W 72/541* (2023.01)

(58) Field of Classification Search
   USPC .......................................................... 370/329
   See application file for complete search history.

(56) References Cited

U.S. PATENT DOCUMENTS

| | | | |
|---|---|---|---|
| 7,907,911 B2 | 3/2011 | Alexiou et al. | |
| 8,249,046 B2 | 8/2012 | Wu et al. | |
| 8,406,720 B2 | 3/2013 | Na et al. | |
| 8,670,432 B2 | 3/2014 | Luo | |
| 8,862,140 B2 | 10/2014 | Khaitan et al. | |
| 8,885,569 B2 | 11/2014 | Dinan | |
| 8,995,300 B2 | 3/2015 | Dinan | |
| 9,008,677 B2 | 4/2015 | Van Nee et al. | |
| 9,252,853 B2 | 2/2016 | Sajadieh | |
| 9,265,048 B2 | 2/2016 | Sampath et al. | |
| 9,451,625 B2 | 9/2016 | Jongren et al. | |
| 9,537,556 B2 | 1/2017 | Zhou et al. | |
| 10,277,348 B2 | 4/2019 | Wu | |
| 10,425,855 B2 | 9/2019 | Sun et al. | |
| 11,006,393 B2 | 5/2021 | Lee et al. | |
| 2006/0025079 A1 | 2/2006 | Sutskover et al. | |
| 2006/0034385 A1* | 2/2006 | Egashira | H04B 7/0669 375/267 |
| 2006/0198455 A1* | 9/2006 | Fujii | H04L 5/0048 375/260 |
| 2009/0110087 A1* | 4/2009 | Liu | H04L 5/0094 375/260 |
| 2009/0135754 A1 | 5/2009 | Yavuz et al. | |
| 2010/0309854 A1 | 12/2010 | Wu et al. | |
| 2011/0170627 A1* | 7/2011 | Kwon | H04L 25/0226 375/295 |
| 2011/0273977 A1* | 11/2011 | Shapira | H04B 7/0626 370/208 |
| 2012/0243630 A1* | 9/2012 | Golovins | H04B 17/327 375/260 |
| 2014/0226505 A1* | 8/2014 | Sadek | H04W 24/10 370/336 |
| 2015/0030094 A1 | 1/2015 | Zhang | |
| 2016/0072564 A1* | 3/2016 | Li | H04B 7/0452 370/329 |
| 2016/0249366 A1 | 8/2016 | Seok | |
| 2016/0301452 A1* | 10/2016 | Kwon | H04B 7/0617 |
| 2016/0365954 A1 | 12/2016 | Lee et al. | |
| 2017/0093530 A1* | 3/2017 | Kudekar | H04B 7/0854 |
| 2019/0140709 A1 | 5/2019 | Guerra et al. | |

OTHER PUBLICATIONS

Asterjadhi, A. et al., "Misc for Trigger Frame Format", IEEE P802.11 Wireless LANs, Aug. 1, 2017, pp. 1-30, IEEE 802.11-17/1264r2, IEEE.

\* cited by examiner

INTERFERENCE AWARE PACKET TRANSMISSION

TECHNICAL FIELD

Embodiments presented herein relate to a method, a radio transceiver device, a computer program, and a computer program product for interference aware packet transmission.

BACKGROUND

In communications networks, there may be a challenge to obtain good performance and capacity for a given communications protocol, its parameters and the physical environment in which the communications network is deployed.

For example, one issue concerns so-called overlapping basic service sets (OBSSs). In general terms, a basic service set (BSS) can be defined as a transmission and reception point (TRP), such as an access point (AP), controlled by a network node (NN) and providing network access in a coverage region. The basic service set could operate so as to provide network access according to an IEEE 802.11 based wireless local area network (WLAN) standard. When two or more BSSs with overlapping frequency intervals, or channels, have a network coverage overlap, they become what are known as OBSSs and might thus potentially interfere with each other. Orthogonal channels might be assigned to neighboring BSSs in order to avoid interference. However, in dense deployments where the density of BSSs outnumbers the number of available channels, or frequency intervals, channels (or frequencies) have to be reused and hence, OBSS is inevitable. Also served terminal devices, such as stations (STAs) might cause interference in the OBSS and compete for channel access. This type of co-channel interference might cause performance loss in communications networks.

One type of transmit beamforming was introduced in the standard IEEE 802.11ac, replacing many different beamforming options introduced in the standard IEEE 802.11n. According to the standard IEEE 802.11ac, the direction of a transmit beam is computed based on Channel State Information (CSI) measurements obtained in a sounding procedure between the beamformer (transmitter) and beamformee (receiver). Typically, but not necessarily, the TRP will act as beamformer and served terminal devices as beamformees.

The standard IEEE 802.11ac proposes the use of beamforming based on so-called null data packet (NDP) sounding in order for the beamformer to obtain an estimate of the channel. The beamforming at the beamformer then depends on this channel estimation procedure for determining how to radiate energy in a desired direction.

A summary of channel sounding based on NDP will be summarized next with reference to FIG. 1.

S1. The beamformer transmit an NDP announcement frame 10 with the purpose of gaining control of the channel. The terminal devices receiving the NDP announcement frame 10 but not addressed by the NDP announcement frame 10 will then defer channel access in order to avoid interference.

S2. The beamformer transmits an NDP frame 20. The structure of this frame is equivalent to a regular data frame but with the data part removed. Hence, the NDP frame 20 mainly comprises training signals through which the channel can be estimated.

S3. The beamformee receiving the NDP frame 20 estimates the channel by measuring on the training part of the NDP frame 20 and feeds back the estimated channel information to the beamformer in a feedback frame 30. The beamformer receives the feedback from the beamformee in the feedback frame 30 and determines the beamforming directions.

The above disclosed sounding procedure introduces high overhead and the gain from beamforming might be lost unless a large amount of data is transmitted.

One way to ensure a longer transmission period when beamforming is used, is to use a so called Transmission Opportunity (TXOP). The network node can then reserve the channel for a comparatively long time period, e.g. 8 ms, and within this time period perform the sounding procedure and transmit multiple packets with beamforming without having to contend for accessing the channel. This will improve the efficiency of the beamforming procedure.

After the beamforming training procedure, the beamformed downlink transmission from the TRP in the BSS starts. However, there is still a possibility that interference is created.

In further aspects, a first radio transceiver device (such as a network node or terminal device), possibly equipped with multiple antennas, that receives a transmission from a second radio transceiver device (such as a network node or terminal device), where the second radio transceiver device will soon receive a packet, should ideally avoid transmitting a signal in the directions of the received transmission from the second radio transceiver device in order to reduce possible interference.

One way to reduce the interference could be for the first radio transceiver device to monitor transmissions from any second radio transceiver devices and estimate the CSI using available Long Training Field (LTF) symbols in the preamble of transmitted packets. However, only multi-stream data transmissions contain enough LTF symbols that allows the full channels to be estimated. All other transmissions (such as trigger frames in IEEE 802.11ax, CSI feedback frames in IEEE 802.11ac, acknowledgment (ACK) packets, etc.) only contain LTF symbols to allow for a single channel to be estimated. The estimate of a single stream might not be enough for a radio transceiver device that has multiple antennas. Currently, when transmitting some of the packets that are not multi-stream transmissions, there is no mechanism for enabling full channel estimation in radio transceiver devices that receive these packets. Hence, other mechanisms are needed in order to enable the interference to be reduced.

Hence, there is still a need for mechanisms that enable the interference to be reduced.

SUMMARY

An object of embodiments herein is to provide efficient mechanisms that enable the interference to be reduced.

According to a first aspect there is presented a radio transceiver device for interference aware packet transmission. The radio transceiver device comprises processing circuitry. The processing circuitry is configured to cause the radio transceiver device to obtain an estimate of interference in a surrounding of the radio transceiver device. The processing circuitry is configured to cause the radio transceiver device to determine how many symbols for channel estimation to include in a packet to be transmitted based on amount of estimated interference. The processing circuitry is configured to cause the radio transceiver device to transmit the packet towards another radio transceiver device, where the packet comprises the determined amount of symbols for channel estimation.

According to a second aspect there is presented a radio transceiver device for interference aware packet transmission. The radio transceiver device comprises an obtain module configured to obtain an estimate of interference in a surrounding of the radio transceiver device. The radio transceiver device comprises a determine module configured to determine how many symbols for channel estimation to include in a packet to be transmitted based on amount of estimated interference. The radio transceiver device comprises a transmit module configured to transmit the packet towards another radio transceiver device, where the packet comprises the determined amount of symbols for channel estimation.

According to a third aspect there is presented a system for interference aware packet transmission. The system comprises at least one radio transceiver device according to any of the first and second aspect.

According to an embodiment the system further comprises the so-called another radio transceiver device.

According to a fourth aspect there is presented a method for interference aware packet transmission. The method is performed by a radio transceiver device. The method comprises obtaining an estimate of interference in a surrounding of the radio transceiver device. The method comprises determining how many symbols for channel estimation to include in a packet to be transmitted based on amount of estimated interference. The method comprises transmitting the packet towards another radio transceiver device, where the packet comprises the determined amount of symbols for channel estimation.

According to a fifth aspect there is presented a computer program for interference aware packet transmission, the computer program comprising computer program code which, when run on a radio transceiver device, causes the radio transceiver device to perform a method according to the fourth aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this is an efficient way to enable the interference to be reduced.

Advantageously this allows the so-called another radio transceiver device to avoid interfering with the radio transceiver device, since the so-called another radio transceiver device is enabled to estimate the channel toward the radio transceiver device. This will help improve the reception at the radio transceiver device since its interference thereby might be reduced.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
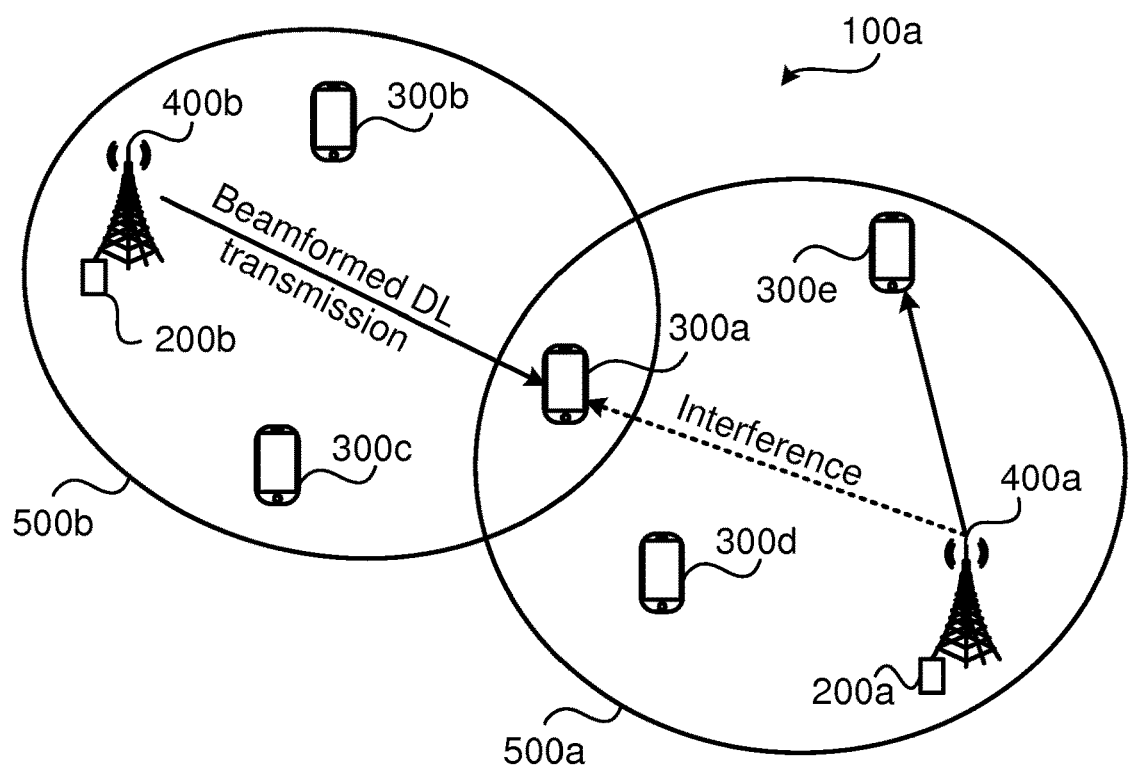
FIGS. 2, 3 and 4 are schematic diagrams illustrating communication networks according to embodiments.

FIG. 2 is a schematic diagram illustrating a communications network 100a where embodiments presented herein can be applied. The communications networks 100a comprises radio transceiver devices 200a, 200b embodied as network nodes, each of which having its own TRP 400a, 400b for serving radio transceiver devices 300a, 300b, 300c, 300d, 300e embodied as terminal devices in a respective coverage region 500a, 500b. Each radio transceiver device 200a, 200b and its TRP 400a, 400b might form a respective BSS. In this respect it is for illustrative purposes assumed that radio transceiver devices 300a, 300b, 300c are served by radio transceiver device 200b and that radio transceiver devices 300d, 300e are served by radio transceiver device 200a.

There could be different examples of network nodes. Examples include, but are not limited to, radio access network nodes, radio base stations, base transceiver stations, node Bs, evolved node Bs, g node Bs, access points, and access nodes.

There could be different examples of terminal devices. Examples include, but are not limited to, portable wireless devices, mobile stations, mobile phones, handsets, wireless local loop phones, user equipment (UE), smartphones, laptop computers, tablet computers, network equipped vehicles, modems, and network equipped sensors.

Figure 1:
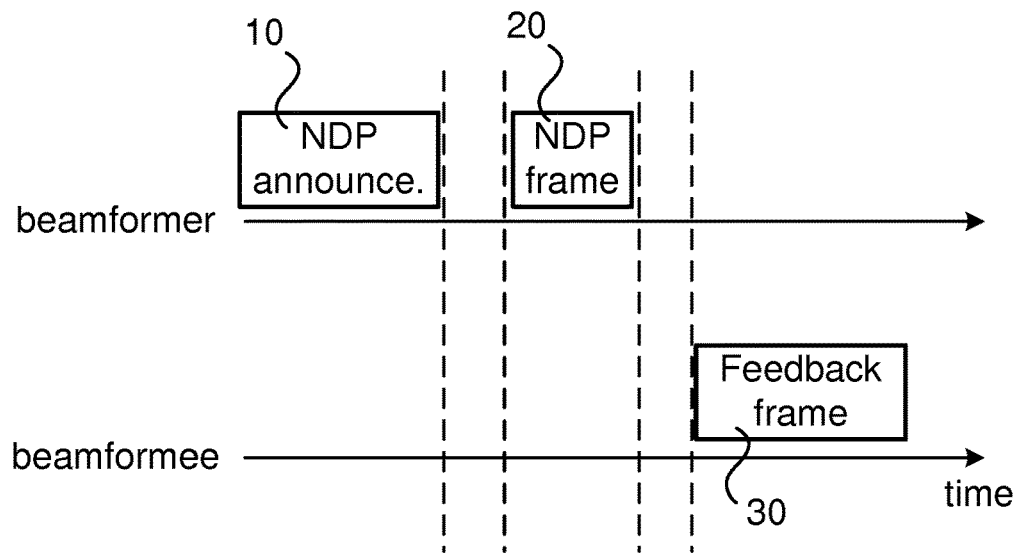
FIG. 1 schematically illustrates null data packet channel sounding in a communication network.

Above it has with reference to FIG. 1 been disclosed how a beam training procedure can be performed in order for the beamformer to determine beamforming weights for subsequent data transmission to its served terminal devices. After the beamforming training procedure, beamformed downlink transmission is thus assumed to start. However, transmission from one TRP 400*a* may cause interference in another BSS. For example, transmissions from a TRP 400*a* in a neighboring BSSs might interfere with the transmission of TRP 400*b* during its TXOP period, thus potentially causing interference.

As in the illustrative example of FIG. 2, the coverage regions 500*a*, 500*b* partly overlap and the BSSs might thus be regarded as defining an OBSS. For example, radio transceiver device 300*a* is assumed to be served by TRP 400*b* of radio transceiver device 200*b* (and thus therefrom receive beamformed downlink (DL) transmission), but might receive transmission acting as interference from TRP 400*a* of radio transceiver device 200*a*. This is illustrated in more detail in FIGS. 3 and 4.

Figure 3:
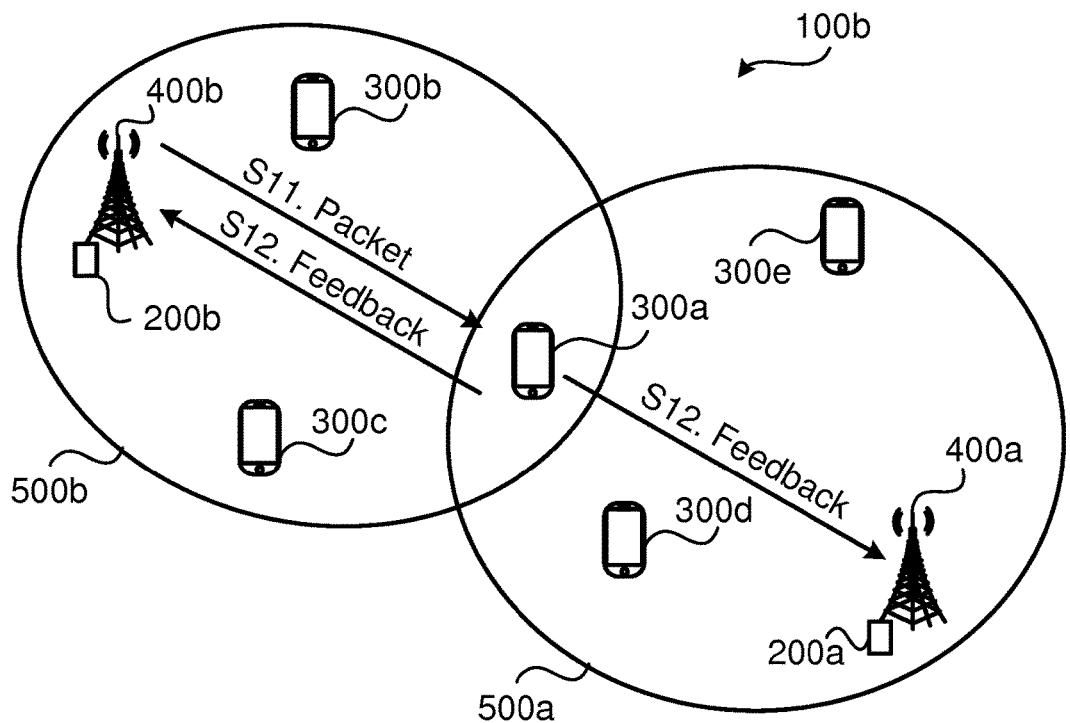

FIG. 3 is a schematic diagram illustrating a communications network 100*b* where embodiments presented herein can be applied. In addition to all features of FIG. 2, FIG. 3 schematically illustrates a message passing occurring between TRP 400*b* and radio transceiver device 300*a*, where TRP 400*b* in step S11 transmits at least one packet, such as a trigger frame, that the radio transceiver device 300*a* is assumed to receive and respond to with its own feedback packet, as in step S12. In some aspects step S11 involves at least both steps S1 and S2 as disclosed above and step S12 involves at least step S3 as disclosed above. Since radio transceiver device 300*a* is located in the partial overlap of coverage regions 500*a*, 500*b*, the response transmitted by radio transceiver device 300*a* to TRP 400*b* of radio transceiver device 200*b* in step S12 will also be received by TRP 400*a* of radio transceiver device 200*a*.

Figure 4:
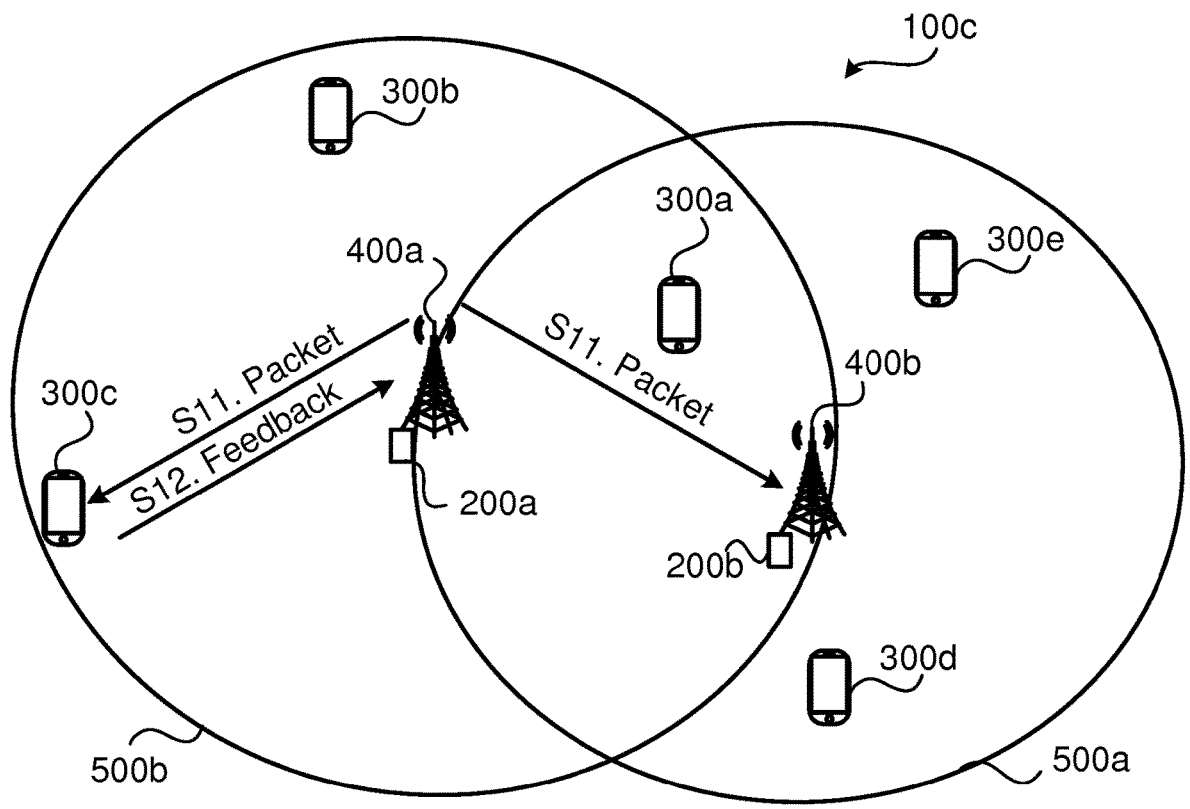

FIG. 4 is a schematic diagram illustrating a communications network 100*c* where embodiments presented herein can be applied. FIG. 4 differs from FIGS. 2 and 3 in that the TRPs 400*a*, 400*b* are located physically closer to each other, thus resulting in the coverage regions 500*a*, 500*b* having a larger partial overlap in FIG. 4 than in FIGS. 2 and 3. FIG. 4 additionally schematically illustrates the message passing occurring as in FIG. 3. Since the TRPs 400*a*, 400*b* are located so close to each other, TRP 400*b* will receive the at least one packet as transmitted in step S11 from TRP 400*a*.

If not handled properly, both illustrative scenarios of FIGS. 3 and 4 will cause interference. Some embodiments disclosed herein therefore relate to mechanisms for mitigating interference in a communications network 100*a*, 100*b*, 100*c*. In order to obtain such mechanisms there is provided a radio transceiver device 200*a*, a method performed by radio transceiver device 200*a*, a computer program product comprising code, for example in the form of a computer program, that when run on a radio transceiver device 200*a*, causes radio transceiver device 200*a* to perform the method.

Figure 5:
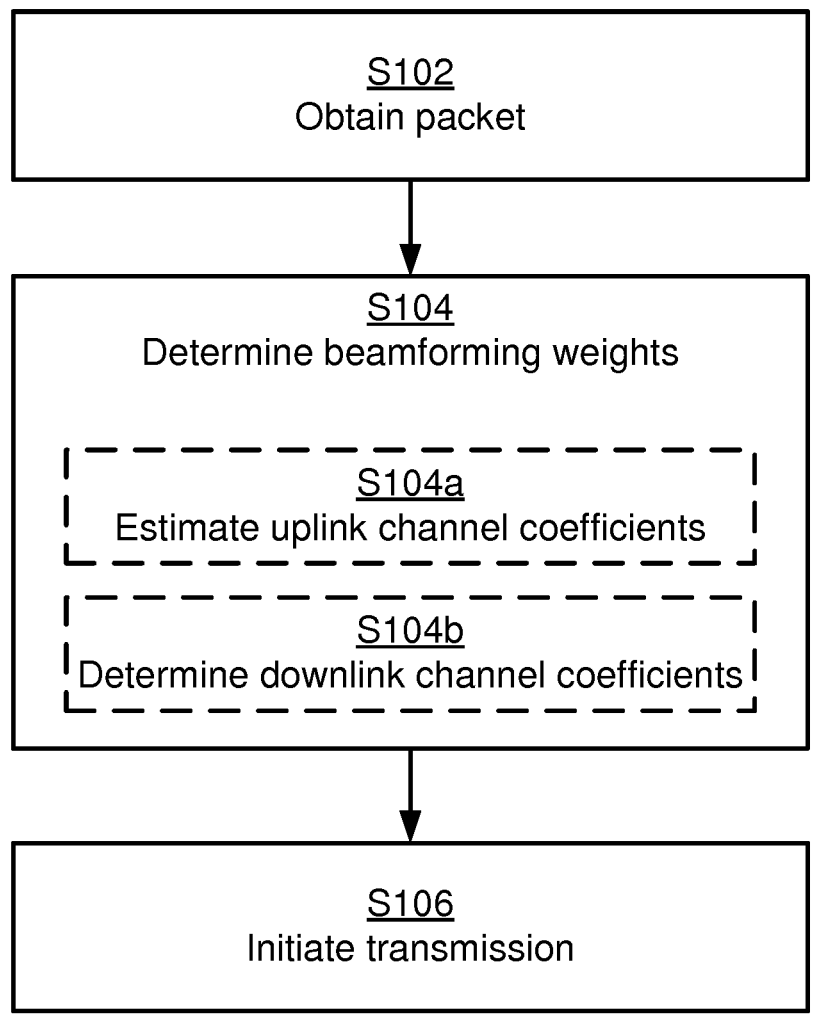
FIGS. 5 and 6 are flowcharts of methods according to embodiments.

Reference is now made to FIG. 5 illustrating a method for mitigating interference in a communications network 100*a*, 100*b*, 100*c* as performed by radio transceiver device 200*a* according to an embodiment. Continued reference is made to FIGS. 2-4.

In general terms, the herein disclosed embodiments are based on a radio transceiver device 200*a* of a TRP 400*a* overhearing transmissions of a packet from a packet sender, where the packet indicates transmission of a further packet (either from the same packet sender or from another packet sender). Particularly, radio transceiver device 200*a* is configured to perform step S102:

S102: Radio transceiver device 200*a* obtains a packet. The packet has been wirelessly received in an uplink direction by a TRP 400*a* of radio transceiver device 200*a* and from a packet sender 200*b*, 300*a*. The packet is indicative of scheduled transmission of a further packet within a predefined time interval from the TRP 400*a* has wirelessly received the packet.

Radio transceiver device 200 then uses information of the direction in which the transmission was received when determining its own beamforming weights so as to reduce, or even minimize, the interference in directions that would cause strong interference during transmission of the further packet. Radio transceiver device 200*a* is thus configured to perform step S104:

S104: Radio transceiver device 200*a* determines beamforming weights such that interference caused by transmission from the TRP 400*a* of radio transceiver device 200*a* in a downlink direction being reversed to the uplink direction is less than a threshold interference value.

The determined beamforming weights are then used during transmission from the TRP 400*a* of radio transceiver device 200*a*. Radio transceiver device 200*a* is thus configured to perform step S106:

S106: Radio transceiver device 200*a* initiates transmission in at least one beam using the determined beamforming weights. The beamforming weights are used for the transmission at least within the predefined time interval.

Embodiments relating to further details of mitigating interference in a communications network 100*a*, 100*b*, 100*c* as performed by radio transceiver device 200*a* will now be disclosed.

There may be different ways to enable the interference caused by the transmission from the TRP 400*a* to be less than the threshold interference value, thus controlling the level of possible interference caused.

In some aspects the interference is controlled by reducing the power in the downlink direction. That is, according to an embodiment the beamforming weights are determined such that transmission power of the transmission in the downlink direction is less than a threshold power value. The threshold power value depends on the threshold interference value.

In some aspects the interference is controlled by using transmission in a channel being orthogonal to the channel in the uplink direction. Radio transceiver device 200*a* might therefore perform channel estimation.

Particularly, according to an embodiment radio transceiver device 200*a* is configured to perform (optional) step S104*a*:

S104*a*: Radio transceiver device 200*a* estimates, using the obtained packet, uplink channel coefficients of an uplink channel in which the packet was wirelessly received from the packet sender 200*b*, 300*a*.

The uplink direction is then defined by the uplink channel. That is, according to an embodiment the uplink direction is defined by the uplink channel coefficients.

The channel in the downlink direction might then be determined. Particularly, according to an embodiment radio transceiver device 200*a* is configured to perform (optional) step S104*b*:

S104*b*: Radio transceiver device 200*a* determines first downlink channel coefficients of a downlink channel towards the packet sender 200*b*, 300*a* using the estimated uplink channel.

The beamforming weights might then be determined from the downlink channel. That is, according to an embodiment the beamforming weights are determined based on the first downlink channel coefficients.

There might be different ways to enable transmission in a channel being orthogonal to the channel in the uplink direction and to enable transmission that is orthogonal to the estimated downlink channel. In some aspects the transmission is orthogonal to the estimated downlink channel (where this estimate might be obtained by transposing the estimate of the uplink channel). Particularly, according to an embodiment the transmission is initiated in a second downlink channel with second downlink channel coefficients being orthogonal to the first downlink channel coefficients. The second downlink channel coefficients then define the beamforming weights. That is, a beam with beamforming weights f is constructed that is orthogonal to $H^T$, where H denotes the uplink channel and defines the uplink channel coefficients and thus $H^T$ denotes the downlink channel and defines the first downlink channel coefficients. In other words, the beamforming weights f are constructed such that $H^T f$ is zero (or close to zero). This is the same as $fH^T$ being zero (or close to zero).

There could be different ways to measure the orthogonality. A common measure used is the Frobenius norm of the product between the beams and the downlink channel. The Frobenius norm is generally defined as $\|H^T V\|$, where the columns of V are the beamforming coefficients (or simply denoted as "beams") of radio transceiver device 200a used during its transmission initiated in step S106, and where $\|x\|$ denotes the Frobenius norm of x. The smaller the Frobenius norm of $\|H^T V\|$, the more orthogonal the transmission is toward the packet sender 200b, 300a. It is noted that the herein disclosed embodiments are not limited to any particular choice to measure the orthogonality.

The packet sender 200b, 300a might use different number of antennas when transmitting the packet that is obtained by radio transceiver device 200a in step S102.

In some aspects it is assumed that the packet sender 200b, 300a uses a single antenna for transmitting the packet. In this case, when radio transceiver device 200a obtains the packet it is, in step S104a able to estimate the complete uplink channel from the packet sender 200b, 300a to itself. Assuming channel reciprocity, the transpose of the uplink channel is the downlink channel. This enables radio transceiver device 200a the possibility to perform downlink transmission to its own served radio transceiver devices 300d, 300e whilst at the same time avoiding causing significant interference to the packet sender 200b, 300a. If h is the estimated uplink channel vector at radio transceiver device 200a (thus replacing H in the expressions above), then $h^T$ is the estimated downlink channel vector and comprises the first downlink channel coefficients. If radio transceiver device 200a intends to transmit a downlink packet to some of its served radio transceiver devices 300d, 300e right after receiving the packet from the packet sender 200b, 300a, it can transmit the downlink packet in a direction that is orthogonal (or close to orthogonal) to $h^T$. In this way, little interference is caused at the packet sender 200b, 300a.

In general terms, the packet might be assumed to comprise a pilot configuration, in turn comprising pilot signals in time and frequency, that allows for estimating the uplink channel for a number of streams. Preferably, the uplink channel is to be estimated to each transmit antenna, to get the full rank of the uplink channel. Then the number of streams will be equal to the number of transmit antennas. Specifically, in Wi-Fi, the number of long training field (LTF) symbols used for uplink channel estimation equals the number of streams. However, in other systems there might be a different design of the pilot signals to allow for estimating the complete uplink channel. In some aspects it is assumed that the packet sender 200b, 300a uses more than one antenna for transmitting the packet. In this case, radio transceiver device 200a might not be enabled to estimate the complete uplink channel between itself and the packet sender 200b, 300a if the packet only comprises one single symbol. In this case, radio transceiver device 200a might only be enabled to estimate one dimension of the uplink channel. For this reason, there might be as many symbols in the packet sent by the packet sender 200b, 300a which enables radio transceiver device 200a to estimate the complete uplink channel. In this case, radio transceiver device 200a in step S104a obtains an estimate H of the uplink channel matrix, where (due to channel reciprocity) $H^T$ is the first downlink channel. As disclosed above, radio transceiver device 200a might thereafter transmit in downlink such that its transmission is orthogonal (or close to orthogonal) to $H^T$. In other aspects only a part of the uplink channel needs to be estimates, which might require fewer symbols in the packet.

There might be different ways to define the predefined time interval. In some aspects, transmission either to or from the packet sender 200b, 300a follows immediately after the packet has been wirelessly received by the TRP 400a of radio transceiver device 200a and lasts for the duration of the TXOP. In some aspects the predefined time interval is therefore defined by the next TXOP. That is, according to an embodiment the predefined time interval is defined as a next-coming transmission opportunity. Thus, although radio transceiver device 200a obtaining the packet sent by the packet sender 200b, 300 might not detect the subsequent transmission either to or from the packet sender 200b, 300a, radio transceiver device 200a knows that such transmission will start immediately following the reception of the packet by the TRP 400a of radio transceiver device 200a. In some aspects the packet has a medium access control (MAC) header that comprises an indication of the duration for the remaining TXOP. The remaining TXOP duration provides radio transceiver device 200a with additional information that is useful when scheduling its own served radio transceiver devices 300d, 300e.

There might be different types of packets that radio transceiver device 200a obtains in step S102.

In some aspects the packet comprises a feedback frame. That is, according to an embodiment the packet compromises channel state information feedback. The packet sender 200b, 300a is then a radio transceiver device 300a not served by radio transceiver device 200a. The intended packet recipient is then radio transceiver device 200b serving radio transceiver device 300a. That is, a radio transceiver device 200a overhearing a CSI feedback frame transmission from a radio transceiver device 300a, not associated to its own BSS, can conclude that this radio transceiver device 300a might experience interference from downlink transmissions from the TRP 400a of radio transceiver device 200a. In case radio transceiver device 300a is an edge user, radio transceiver device 300a is likely to experience a large path loss, will be vulnerable to any interference arising in radio transceiver device 200a.

There might be different types of information in the packet obtained in step S102 on which the uplink channel estimation is based. According to an embodiment the packet has a preamble. The preamble comprises a legacy long training field (L-LTF). The uplink channel coefficients are then estimated for at least one symbol in the L-LTF field.

The L-LTF might comprise one or more LTF symbols. For example, extra LTF symbols might be provided in the CSI feedback frame in order to enable radio transceiver device 200a to learn the complete uplink channel, depending on the number of antennas used by the packet sender 200b, 300a. Particularly, according to an embodiment the L-LTF consists of as many symbols as the packet sender 200b, 300a has antennas. There are thereby as many symbols in the packet sent by the packet sender 200b, 300a which enables radio transceiver device 200a to estimate the complete uplink channel.

In some aspects the packet comprises an indication that the packet sender 200b, 300a requires a response from the intended packet receiver. Particularly, according to an embodiment the packet is an announcement packet. The packet sender 200b, 300a is then a TRP 400b of another radio transceiver device 200b. The intended packet recipient is then a radio transceiver device 300a served by radio transceiver device 200b of the TRP 400b. For example, the announcement packet might comprise an NDP announcement frame.

Further embodiments disclosed herein relate to mechanisms for interference aware packet transmission. In order to obtain such mechanisms there is provided a radio transceiver device 200a, 300a, a method performed by the radio transceiver device 200a, 300a, a computer program product comprising code, for example in the form of a computer program, that when run on a radio transceiver device 200a, 300a, causes the radio transceiver device 200a, 300a to perform the method.

In the below, radio transceiver device 200a, 300a takes the role of the packet transmitter and radio transceiver devices 200b, 300b, 300c, 300d, 300e takes the role of the packet receiver.

Figure 6:
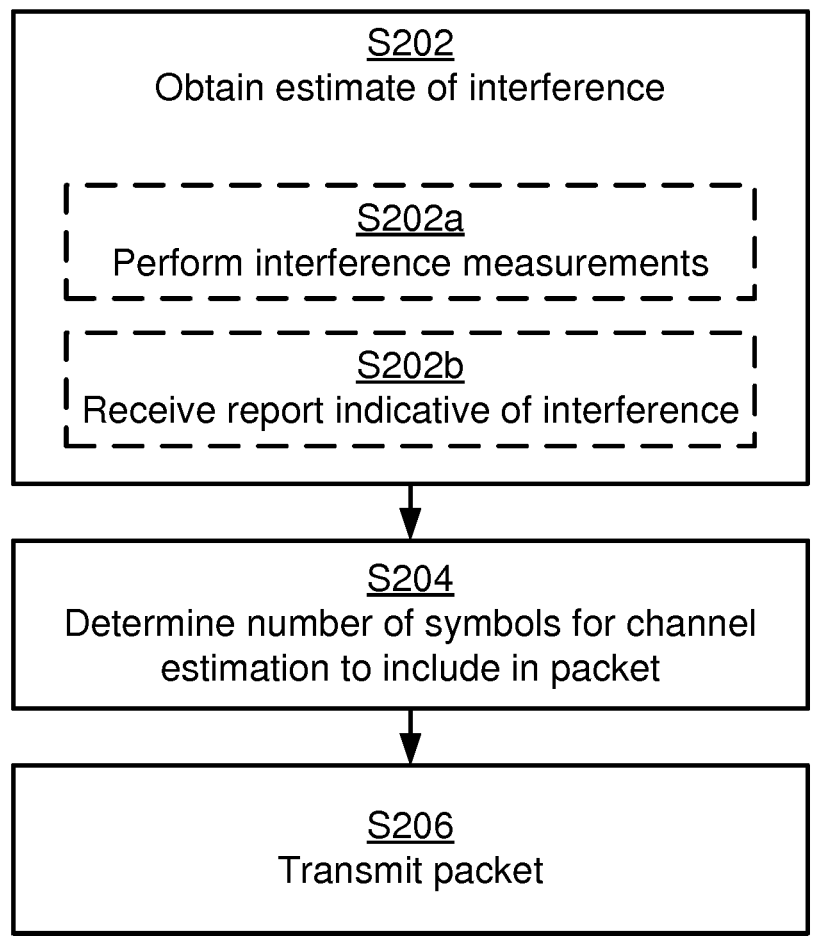

FIG. 6 is a flowchart illustrating embodiments of methods for interference aware packet transmission. The methods are performed by the radio transceiver device 200a, 300a. The methods are advantageously provided as computer programs 1020. Continued reference is made to FIGS. 2-4.

First, radio transceiver device 200a, 300a needs to be aware of how much interference is present in its surrounding. In this respect, the interference is caused by transmission from other radio transceiver devices 200b, 300b, 300c, 300d, 300e. Particularly, radio transceiver device 200a, 300a is configured to perform step S202:

S202: Radio transceiver device 200a, 300a obtains an estimate of interference in a surrounding of radio transceiver device 200a, 300a. In this respect, the surrounding of radio transceiver device 200a, 300a corresponds to the physical region in which radio transceiver device 200a, 300a is located.

Radio transceiver device 200a, 300a then uses the information about the estimate of interference in order to adapt the number of symbols for channel estimation to include in a packet to be transmitted. Particularly, radio transceiver device 200a, 300a is configured to perform step S204:

S204: Radio transceiver device 200a, 300a determines how many symbols for channel estimation to include in a packet to be transmitted based on amount of estimated interference. In this respect, the amount of estimated interference is thus defined by how much interference that was estimated in step S202. In this respect, the symbols for channel estimation might be regarded as channel estimation resources. In other words, these symbols do not need to be OFDM symbols placed after each other in the time domain. They could be subcarriers located at different frequencies (as e.g. in LTE). Thus, these symbols might be spread out in time and/or frequency. For example, an Orthogonal Cover Code (OCC) might be used to multiplex the symbols for different streams. These streams might cover the same subcarriers and the same OFDM symbols. Hence, it should be understood here that the symbols should not be narrowly interpreted as OFDM symbols, but more generally as channel estimation resources.

S206: Radio transceiver device 200a, 300a transmits the packet towards radio transceiver device 200b, 300b, 300c, 300d, 300e, where the packet comprises the determined amount of symbols for channel estimation.

This enables radio transceiver device 200b, 300b, 300c, 300d, 300e receiving the packet to estimate the channel in the direction towards radio transceiver device 200a, 300a and thus enables radio transceiver device 200b, 300b, 300c, 300d, 300e to steer its transmission away from radio transceiver device 200a, 300a. This will reduce the amount of interference in the surrounding of radio transceiver device 200a, 300a.

Embodiments relating to further details of interference aware packet transmission as performed by radio transceiver device 200a, 300a will now be disclosed.

There could be different types of packets. In some aspects the type of packet depends on the type of radio transceiver device 200a, 300a. According to an embodiment the packet is a single-stream packet. According to an embodiment the packet is a feedback frame. This is a typical case where radio transceiver device is a terminal device. According to an embodiment the packet is a trigger frame (for example an uplink (UL) multi-user (MU) multiple-input multiple-output (MIMO) frame. This is a typical case where radio transceiver device is a network node.

According to an embodiment the packet is indicative of scheduled transmission of a further packet within a predefined time interval from the transmission of the packet. According to an embodiment the packet is indicative of scheduled transmission of a further packet to radio transceiver device 200a, 300a.

There could be different ways in which the symbols for channel estimation are included in the packet.

In some aspects the symbols are part of the preamble. That is, according to an embodiment the packet has a preamble, and the symbols are located in the preamble.

There could be different types of preambles. According to an embodiment the preamble comprises a high efficiency long training field (HE-LTF), or a very high throughput long training field (VHT-LTF), and at least one of the symbols is located in the HE-LTF or the VHT-LTF.

Figure 7:
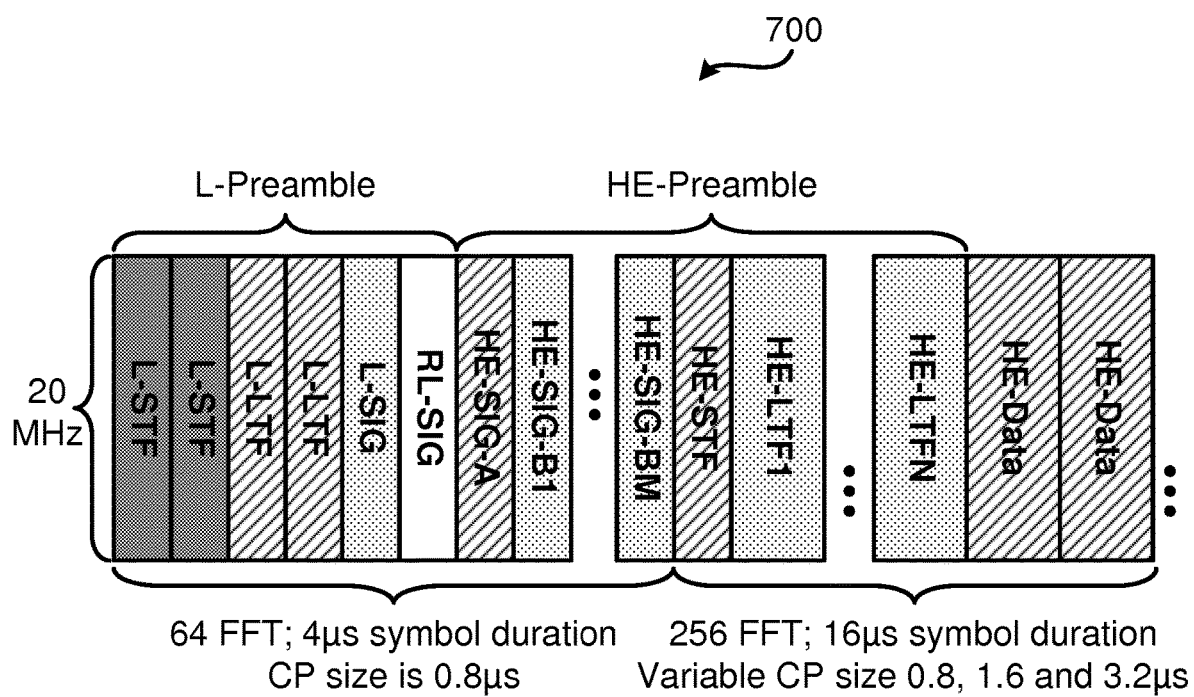
FIG. 7 schematically illustrates packet preambles according to an embodiment.

FIG. 7 schematically illustrates packet preambles 700 according to an embodiment. In further detail, FIG. 7 schematically illustrates preambles as specified according to the standard IEEE 802.11ax for a transmission having multiple LTF symbols (denoted HE-LTF1, . . . , HE-LTFN) in a so-called high efficiency (HE) preamble that allows a packet receiver to estimate the channel for N streams.

In other aspects the symbols are not part of any preamble. For example, the symbols could be included in a data field of the packet.

In yet other aspects, some symbols are part of the preamble whilst other symbols are not. That is, at least one symbol could be included in the preamble whilst at least one other symbol could be included in a data field of the packet.

There could be different ways for radio transceiver device 200a, 300a to determine how many symbols for channel estimation to include in the packet.

In some aspects the determining is based on comparing the estimated interference to a threshold. Particularly, according to an embodiment the determining (as in step S204) of how many symbols for channel estimation to include is based on comparing the estimate of interference to at least one threshold value.

There could be different examples of thresholds.

In some aspects the threshold is an energy detection threshold. According to an embodiment the at least one threshold value is an energy detection threshold value. For example, in case of trigger frame transmission from radio transceiver device 200a, 300a, as in e.g. IEEE 802.11ax, the sensed interference should be lower than the energy detection threshold (such as −62 dBm (for Wi-Fi), −72 dBm (for LAA/MulteFire, where LAA is short for Licensed Spectrum Access), or −82 dBm (for preamble detection)) so that radio transceiver device 200a, 300a can gain access to the channel and transmit the trigger frame. Hence, if radio transceiver device 200a, 300a senses interference close to the energy detection threshold, it is aware that there is significant interference in its surrounding, and thus it should add additional symbols for channel estimation in the trigger frame, enabling any surrounding radio transceiver devices 200b, 300b, 300c, 300d, 300e to avoid interfering with the subsequent data reception (UL MU-MIMO or UL OFDMA) of radio transceiver device 200a, 300a. Radio transceiver device 200a, 300a might continuously monitor the interference level to have a more accurate estimate at the time of trigger frame transmission.

In some aspects the threshold is defined by the maximum interference radio transceiver device 200a, 300a can tolerate. According to an embodiment the at least one threshold value is set to a highest interference level tolerable by radio transceiver device 200a, 300a. In this respect, the highest interference level tolerable by radio transceiver device 200a, 300a might correspond to that amount of interference that can be present that still enables radio transceiver device 200a, 300a to correctly decode received packets, or to correctly decode received packets with a bit, symbol, or frame, error probability below a threshold value. For example, in the case of a CSI feedback frame, the sensed interference does not need to be below the energy detection threshold, since the radio transceiver device 200a, 300a transmitting the CSI feedback frame does not need access to the channel (it will receive data after some period). In this case, the interference threshold should be set to the maximum value that radio transceiver device 200a, 300a can tolerate when receiving subsequent data transmission. In other words, it should be set so that the minimum SINR necessary for receiving the subsequent data transmission is reached. If the SINR degradation is severe, i.e., the interference is above the threshold necessary to receive the data, the radio transceiver device 200a, 300a will then add extra symbols for channel estimation in the CSI feedback frame.

In some aspects the determining is based on the number of antennas on which the packet is transmitted. Hence, the number of symbols to transmit might be a function of the interference level and the number of antennas at the radio transceiver device 200a, 300a.

There could be different ways for radio transceiver device 200a, 300a to obtain the estimate of interference in step S202.

In some aspects, information of the surrounding interference is sensed by radio transceiver device 200a, 300a itself. Particularly, according to an embodiment radio transceiver device 200a, 300a is configured to perform step S202a as part of obtaining the estimate of interference in step S202:

S202a: Radio transceiver device 200a, 300a performs interference measurements.

In some aspects, information of the surrounding interference is obtained from an interference report. In more detail, at least one other radio transceiver device 200b, 300b, 300c, 300d, 300e can assist in estimating the interference in the surrounding of radio transceiver device 200a, 300a by overhearing transmissions from other radio transceiver devices than radio transceiver device 200a, 300a. This information can be signaled to radio transceiver device 200a, 300a in a special control packet or piggybacked on other transmissions. This can be useful when radio transceiver device 200a, 300a is busy with transmitting or receiving data. Several other radio transceiver devices 200b, 300b, 300c, 300d, 300e might provide reports on the interference. Particularly, according to an embodiment radio transceiver device 200a, 300a is configured to perform step S202b as part of obtaining the estimate of interference in step S202:

S202b: Radio transceiver device 200a, 300a receives a report from radio transceiver device 200b, 300b, 300c, 300d, 300e. The report is indicative of the estimate of interference.

The report might comprise the number of transmissions heard over a time period, their durations and received power level. In case two or more reports are received, radio transceiver device 200a, 300a might correlate in time the different reports to determine if multiple other radio transceiver device 200b, 300b, 300c, 300d, 300e have experienced the same interference pattern.

In some aspects, information of the surrounding interference is obtained as a combination of the interference measurements (representing a first source of interference information) performed by radio transceiver device 200a, 300a and at least one report (representing a second source of interference information) received by radio transceiver device 200a, 300a. Different weight factors could be applied on the two sources of interference information, for example depending on the number of samples in source of interference information measurement, the age of each sample, etc.

A system for interference aware packet transmission (in a communications network 100a, 100b, 100c), could be defined as comprising at least one radio transceiver device 200a, 300a as herein disclosed. In some aspects the system further comprises the so-called another radio transceiver device 200b, 300b, 300c, 300d, 300e.

Figure 8:
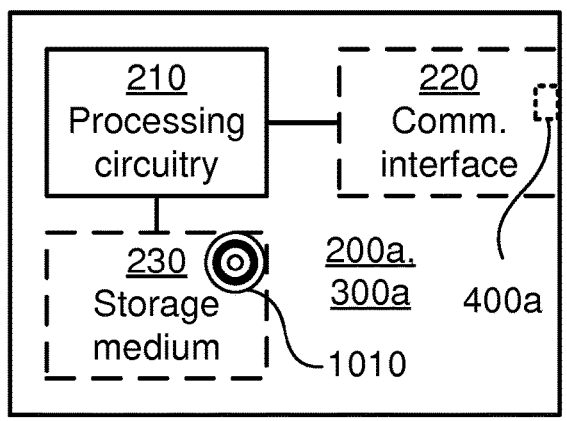
FIG. 8 is a schematic diagram showing functional units of a radio transceiver device according to an embodiment.

FIG. 8 schematically illustrates, in terms of a number of functional units, the components of a radio transceiver device 200a, 300a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a, 300a to perform a set of operations, or steps, S202-S206, as disclosed above. For example, the storage medium 230 may store the set of operations, and the processing circuitry 210 may be configured to retrieve the set of operations from the storage medium 230 to cause the radio transceiver device 200a, 300a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a, 300a may further comprise a communications interface 220 at least configured for communications with other devices, entities, functions, and nodes, such as radio transceiver devices 200b, 300b, 300c, 300d, 300e of the communications networks 100a-100c. As such the communications interface 220 may comprise one or more transmitters and receivers, comprising analogue and digital components.

The processing circuitry 210 controls the general operation of the radio transceiver device 200a, 300a e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a, 300a are omitted in order not to obscure the concepts presented herein.

Figure 9:
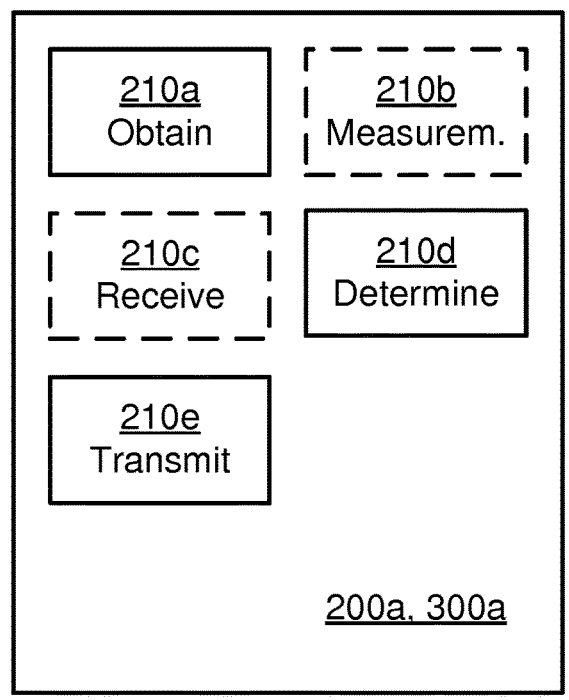
FIG. 9 is a schematic diagram showing functional modules of a radio transceiver device according to an embodiment.

FIG. 9 schematically illustrates, in terms of a number of functional modules, the components of a radio transceiver device 200a, 300a according to an embodiment. The radio transceiver device 200a, 300a of FIG. 9 comprises a number of functional modules; an obtain module 210a configured to perform step S202, a determine module 210d configured to perform step S204, and a transmit module 210e configured to perform step S206. The radio transceiver device 200a, 300a of FIG. 9 may further comprise a number of optional functional modules, such as any of a measurement module 210b configured to perform step S202a and a receive module 210c configured to perform step S202b. In general terms, each functional module 210a-210e may in one embodiment be implemented only in hardware and in another embodiment with the help of software, i.e., the latter embodiment having computer program instructions stored on the storage medium 230 which when run on the processing circuitry makes the radio transceiver device 200a, 300a perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The radio transceiver device 200a, 300a may be provided as a standalone device or as a part of at least one further device. For example, the radio transceiver device 200a, 300a may be embodied as a network node or as a terminal device. Alternatively, functionality of the radio transceiver device 200a, 300a may be distributed between at least two devices, or nodes. These at least two nodes, or devices, may either be part of the same network part (such as the radio access network or the core network) or may be spread between at least two such network parts.

Thus, a first portion of the instructions performed by the radio transceiver device 200a, 300a may be executed in a first device, and a second portion of the of the instructions performed by the radio transceiver device 200a, 300a may be executed in a second device; the herein disclosed embodiments are not limited to any particular number of devices on which the instructions performed by the radio transceiver device 200a, 300a may be executed. Hence, the methods according to the herein disclosed embodiments are suitable to be performed by a radio transceiver device 200a, 300a residing in a cloud computational environment. Therefore, although a single processing circuitry 210 is illustrated in FIG. 8 the processing circuitry 210 may be distributed among a plurality of devices, or nodes. The same applies to the functional modules 210a-210e of FIG. 9 and the computer program 1020 of FIG. 10 (see below).

Figure 10:
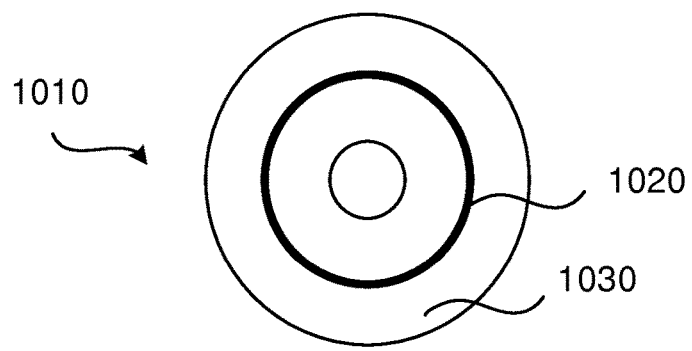
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A radio transceiver device having multiple antennas configured for interference aware packet transmission, the radio transceiver device comprising:
   processing circuitry;
   memory comprising instructions executable by the processing circuitry whereby the radio transceiver device is configured to:
      obtain an estimate of interference generated by neighboring radio transceiver devices in a surrounding of the radio transceiver device, wherein the estimate of interference comprises a measured interference level for the neighboring radio transceiver devices;
      determine a number of Long Training Field (LTF) symbols needed for channel estimation based on an amount of the estimate of interference and a number of the multiple antennas at the radio transceiver device; and
      transmit a feedback packet or trigger packet from the multiple antennas containing the determined number of LTF symbols for channel estimation to enable estimation of a full channel between a receiving radio transceiver device and each of the multiple antennas at the radio transceiver device.

2. The radio transceiver device of claim 1, wherein the packet is indicative of scheduled transmission of a further packet within a predefined time interval from the transmission of the packet.

3. The radio transceiver device of claim 1, wherein the packet is indicative of scheduled transmission of a further packet to the radio transceiver device.

4. The radio transceiver device of claim 1:
wherein the packet has a preamble; and
wherein the LTF symbols are located in the preamble.

5. The radio transceiver device of claim 4:
wherein the preamble comprises a high efficiency long training field (HE-LTF) or a very high throughput long training field (VHT-LTF); and
wherein at least one of the LTF symbols is located in the HE-LTF or the VHT-LTF.

6. The radio transceiver device of claim 1, wherein the instructions are such that the radio transceiver device is operative to determine the number of LTF symbols needed for channel estimation based on comparing the estimate of interference to at least one threshold value.

7. The radio transceiver device of claim 6, wherein the at least one threshold value is an energy detection threshold value.

8. The radio transceiver device of claim 6, wherein the at least one threshold value is set to a highest interference level tolerable by the radio transceiver device.

9. The radio transceiver device of claim 1, wherein the instructions are such that the radio transceiver device is operative to obtain the estimate of interference by performing interference measurements.

10. The radio transceiver device of claim 1, wherein the instructions are such that the radio transceiver device is operative to obtain the estimate of interference by receiving a report from a neighboring radio transceiver device, wherein the report is indicative of the estimate of interference.

11. A system for interference aware packet transmission, the system comprising:
a radio transceiver device having multiple antennas configured for interference aware packet transmission, the radio transceiver device comprising:
processing circuitry;
memory comprising instructions executable by the processing circuitry whereby the radio transceiver device is configured to:
obtain an estimate of interference generated by neighboring radio transceiver devices in a surrounding of the radio transceiver device, wherein the estimate of interference comprises a measured interference level for the neighboring radio transceiver devices;
determine a number of Long Training Field (LTF) symbols needed for channel estimation based on an amount of the estimate of interference and a number of the multiple antennas at the radio transceiver device; and
transmit a feedback packet or trigger packet from the multiple antennas containing the determined number of LTF symbols for channel estimation to enable estimation of a full channel between a receiving radio transceiver device and each of the multiple antennas at the radio transceiver device.

12. The system of claim 11, further comprising the receiving radio transceiver device.

13. A method for interference aware packet transmission, the method comprising a radio transceiver device:
obtaining an estimate of interference generated by neighboring radio transceiver devices in a surrounding of the radio transceiver device, wherein the estimate of interference comprises a measured interference level for the neighboring radio transceiver devices;
determining a number of Long Training Field (LTF) symbols needed for channel estimation based on an amount of the estimate of interference and a number of multiple antennas at the radio transceiver device; and
transmitting a feedback packet or trigger packet from the multiple antennas containing the determined number of LTF symbols needed for channel estimation to enable estimation of a full channel between a receiving radio transceiver device and each of the multiple antennas at the radio transceiver device.

14. A non-transitory computer readable recording medium storing a computer program product for interference aware packet transmission, the computer program product comprising program instructions which, when run on processing circuitry of a radio transceiver device, causes the radio transceiver device to:
obtain an estimate of interference generated by neighboring radio transceiver devices in a surrounding of the radio transceiver device, wherein the estimate of interference comprises a measured interference level for the neighboring radio transceiver devices;
determine a number of Long Training Field (LTF) symbols needed for channel estimation based on an amount of the estimate of interference and a number of multiple antennas at the radio transceiver device; and
transmit a feedback packet or trigger packet from the multiple antennas containing the determined number of LTF symbols for channel estimation to enable estimation of the full channel between a receiving radio transceiver device and each of the multiple antennas at the radio transceiver device.

* * * * *